United States Patent [19]

Wickland

[11] 4,109,464
[45] Aug. 29, 1978

[54] VAPOR GUARD SYSTEM

[75] Inventor: Warren A. Wickland, Lake Orion, Mich.

[73] Assignee: General Motors Corporation, Detroit, Mich.

[21] Appl. No.: 805,010

[22] Filed: Jun. 9, 1977

[51] Int. Cl.² .......................................... F15B 21/04
[52] U.S. Cl. ...................................... 60/397; 55/316; 92/78; 123/119 F
[58] Field of Search .......................... 60/397, 411, 453; 91/369 B; 92/78, 79; 55/316, 327; 123/136, 119 F

[56] References Cited

U.S. PATENT DOCUMENTS

| | | | |
|---|---|---|---|
| 2,450,864 | 10/1948 | Callaway et al. | 123/196 |
| 3,086,544 | 4/1963 | Yost | 137/315 |
| 3,249,021 | 5/1966 | Wuellner | 91/369 B |
| 3,456,635 | 7/1969 | Hervert | 123/136 |
| 3,646,731 | 3/1972 | Hansen | 55/316 |
| 3,675,634 | 7/1972 | Tatsutomi et al. | 123/136 |
| 3,759,234 | 9/1973 | Buckton et al. | 123/136 |
| 3,773,023 | 11/1973 | Taylor | 123/119 F |
| 3,884,204 | 5/1975 | Krautwurst et al. | 123/136 |
| 3,910,302 | 10/1975 | Sudhir | 137/43 |
| 3,971,406 | 7/1976 | Inada et al. | 137/493.4 |

Primary Examiner—Edgar W. Geoghegan
Attorney, Agent, or Firm—D. D. McGraw

[57] ABSTRACT

An activated charcoal filter is placed in the vacuum conduit between a brake booster and the point where the conduit is connected to an engine to tap intake vacuum for booster power. When for any reason fuel vapor from the engine tends to flow toward the brake booster the charcoal of the filter adsorbs the fuel vapor. When flow of air returns to the normal flow direction, from the booster to the engine, the fuel vapors are desorbed and returned to the engine. Thus the filter has a self-purging action. This effectively prevents condensed fuel vapor from adversely affecting elements of the booster such as the diaphragm when under some particular circumstances and in certain installations fuel vapor would otherwise be introduced into the booster and condensed.

3 Claims, 2 Drawing Figures

VAPOR GUARD SYSTEM

The invention relates to a vapor guard system for a servomotor, and more particularly to a system which prevents vapors from reaching the servometer at any time, such vapors being present at a pressure source for the servomotor. In the disclosed embodiment of the invention the servometer is a vacuum suspended power brake booster powered by vacuum from the intake of the automobile internal combustion engine and air at atmospheric pressure. The invention also can be used with other types of servomotors having different functions but having one or more parts which may be adversely affected by vapors from a pressure source. It could, for example be used in a servomotor connected to the engine exhaust system, or in a positive pressure system in which vapors are found which could possibly cause damage to the servomotor.

The type of power brake booster systems in use for many years in vehicles has included a brake booster having a diaphragm as part of the power wall and dividing the booster housing into a vacuum chamber and a variable pressure chamber. When the booster is inactive, both chambers are at vacuum. Upon booster actuation the connection between the two chambers is closed and atmospheric air pressure is controllably introduced into the variable pressure chamber, setting up a pressure differential across the power wall and actuating the booster. A check valve is provided as a part of the booster and provides a connection of the vacuum conduit to the booster vacuum chamber. The other end of the vacuum conduit is tapped into a portion of the vehicle internal combustion engine where intake vacuum is present. This may be at the base of the carburetor or in a portion of the intake manifold downstream of the carburetor, for example. In certain installations it has been found that fuel vapor is present at the point where the vacuum conduit is tapped in and, under certain relatively rare conditions, can be pulled into the vacuum chamber of the booster and condensed. One such condition has been found to occur in extremely cold ambient temperatures which cause the check valve not to fully seal the vacuum conduit relative to the vacuum chamber when the absolute pressure in the vacuum chamber is lower than the absolute pressure in the engine intake acting as the vacuum source. This can occur upon full throttle opening or when the engine is not running. If a sufficient concentration of fuel vapor is located at the vacuum conduit tap-in point on the engine when this occurs, it will be entrained in the flow of air that moves from the engine through the conduit toward the vacuum chamber. A concentration of fuel vapor and condensed fuel in the vacuum chamber can adversely effect materials made of some synthetic or natural rubbers. The power diaphragm is usually made of such a material. It is therefore desirable to prevent any fuel vapor from entering the brake booster through the vacuum conduit if the circumstances occur together in an installation which would tend to introduce the fuel vapor into the booster.

It is therefore proposed to provide a vapor guard system for the booster servomotor which includes a filter in the vacuum conduit between the internal combustion engine source of vacuum and the brake booster check valve so that all fluid flowing in either direction between the brake booster and the engine vacuum source must pass through the filter. The filter is provided with a material which will trap or adsorb the fuel vapor that is entrained in any air flow going from the internal combustion engine toward the brake booster. When the air flow returns to the normal flow pattern, which is the predominant condition where there is any flow at all, the fuel vapor so trapped or adsorbed will be released or desorbed and will be returned to the engine with the air flowing from the booster toward the engine. Thus at no time will the deleterious vapor be permitted to come into the presence of any part of the brake booster which can be adversely affected by it, insofar as transmission of such vapor through the vacuum conduit connecting the booster and the internal combustion engine is concerned.

It is a particular feature of the invention that the flow from the pressure source having the vapor entrained therein does not complete its travel to the servomotor, and that the flow of air through the servomotor toward the pressure source reentrains the trapped or adsorbed vapor so that the vapor is returned to the pressure source. No vapors are permitted in the portion of the conduit between the filter and the servomotor. Therefore the servomotor is guarded against the presence of adverse vapor, and the filter is self-purging. The material used in the filter may be activated charcoal, which will adsorb and desorb fuel vapors in the manner described. Other suitable materials may also be utilized.

IN THE DRAWING

Figure 1:
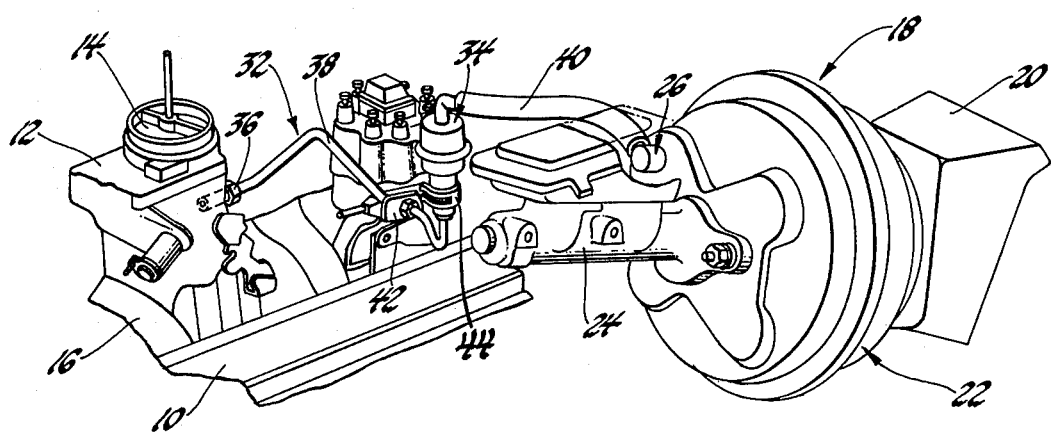
FIG. 1 is a perspective view with parts broken away and illustrating a system embodying the invention. The system includes a vacuum suspended brake booster and an internal combustion engine, the fuel and air intake of which acts as the vacuum source for the booster.

The system shown in the drawing includes an engine 10 of the internal combustion type commonly used to power motor vehicles. The engine is illustrated as having a carburetor 12 providing part of a fuel and air intake 14. The fuel and air intake includes not only the carburetor but also the engine intake manifold 16. A vacuum suspended brake booster and master cylinder assembly 18 is suitably mounted to a portion 20 of the vehicle for actuation by the vehicle operator in the usual manner. Assembly 18 includes the servomotor 22 and the master cylinder 24. The servomotor has a vacuum check valve assembly 26 mounted on the servomotor housing 28 and opening at one side into the servomotor vacuum chamber 30. The other side of the vacuum check valve assembly 26 is connected by a vacuum conduit 32 to a portion of the fuel and air intake 14 of engine 10. This provides a vacuum source for the brake booster servomotor 22. Conduit 32 has a filter 34 therein intermediate the tap-in point 36 of the conduit at the fuel and air intake 14 and the vacuum check valve assembly 26. In the installation illustrated, the portion of the conduit between filter 34 and tap-in point 36 is a pipe 38 and the portion between vacuum check valve assembly 26 and filter 34 is a hose 40. Pipe 38 is supported on the engine adjacent filter 34 by a mounting bracket 42. Filter 34 has a mounting bracket 44 which also secures the filter assembly to the engine.

Figure 2:
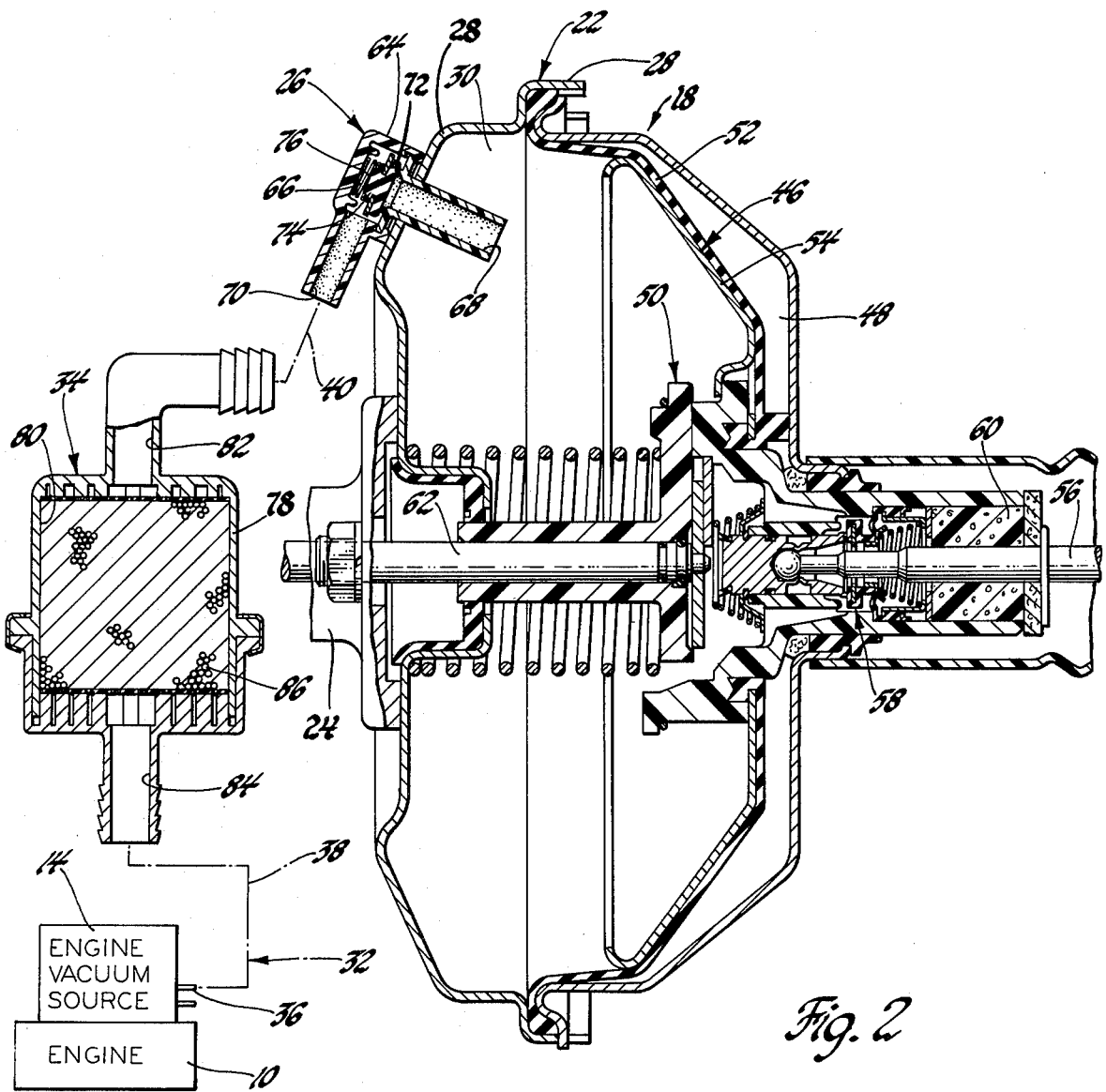
FIG. 2 is a cross section view, with parts broken away, illustrating the vacuum suspended booster and check valve as well as the vapor entrapment filter, portions of the system being schematically illustrated.

As more particularly seen in FIG. 2, the brake booster servomotor 22 has a power wall 46 dividing housing 28 into vacuum chamber 30 and a variable pressure chamber 48. Power wall 46 includes a piston 50, a flexible diaphragm 52, and a diaphragm support member 54. The outer periphery of diaphragm 52 is sealingly secured to housing 28, while piston 50, diaphragm support member 54 and the inner periphery of diaphragm 52 are linearly movable. The servomotor 22 includes an input push rod 56 which is moved by the vehicle operator to control the brake system. Push rod 56 is connected to control valve assembly 58 to control the pressure changes in variable pressure chamber 48. An atmospheric air pressure inlet is provided through atmospheric air filter 60. The servomotor has an output push rod 62 which is moved by the power wall 46 upon servomotor actuation to actuate the master cylinder assembly 24 and pressurize the brake circuitry of the vehicle. The pressure servomotor assembly 22 is typical of servomotors in common usage in this application. An example of the servomotor, with a more detailed description of its operation, is found in U.S. Pat. No. 3,249,021, issued May 3, 1966 and entitled "Power Brake Booster."

The vacuum check valve assembly 26 may be of any suitable type and is illustrated as being of the type shown in U.S. Pat. No. 3,086,544, issued Apr. 23, 1963 and entitled "Check Valve." Valve assembly 26 has a housing 64 defining a valve chamber 66. The valve assembly has a pair of ports respectively defined by housing passages 68 and 70. The end of passage 68 opening into chamber 66 defines a valve seat 72. Check valve 74 is contained within chamber 66 and is urged against seat 72 by spring 76. Passage 70 is always connected with chamber 66. Passage 68 opens into vacuum chamber 30 of servomotor 22, and passage 70 is connected to the hose 40 forming a part of vacuum conduit 32. It can be seen that so long as the absolute pressure in passage 70 is less than the absolute pressure in vacuum chamber 30, to at least a slight extent, valve 74 is held open against the closing force of spring 76. This is the condition normally occurring when vacuum chamber 30 is being evacuated to a lower absolute pressure by vacuum from the vacuum source 14. If the absolute pressure in passage 70 equals or exceeds the absolute pressure in vacuum chamber 30, spring 76 will close check valve 74 against seat 72, holding the lower absolute pressure in vacuum chamber 30. This normally occurs when the internal combustion engine 10 is not running and also can occur when the throttle valve in carburetor 12 is fully open so as to momentarily increase the absolute pressure in intake 14 to a higher level than the absolute pressure in vacuum chamber 30.

The filter 34 includes a housing 78 having a chamber 80 formed therein. One side of chamber 80 is connected with the port 82 and the other side is connected to a port 84, ports 82 and 84 being provided on opposite sides of the filter assembly 34. Port 82 is connected to hose 40 of vacuum conduit 32 at the other end of the hose from the point where the hose connects with passage 70 of vacuum check valve assembly 26. Port 84 is connected to pipe 38 of vacuum conduit 32 at the other end of the pipe from the vacuum tap-in point 36. Chamber 80 of filter assembly 34 contains a suitable material 86 which can trap or adsorb fuel vapor and can release or desorb the vapor. A preferred material is activated charcoal and is provided in sufficient quantity to be able to contain the amount of fuel vapor trapped therein between filter purging actions without allowing any of the fuel vapor to reach port 82 from port 84.

In the servomotor condition illustrated, the brake servomotor in the released position and control valve assembly 58 provides a fluid connection between vacuum chamber 30 and variable pressure chamber 48 so that both chambers have vacuum therein. Thus the servomotor is vacuum suspended. When the servomotor is to be actuated, the vehicle operator causes push rod 56 to be moved leftwardly as seen in FIG. 2 to disconnect the connection between chambers 30 and 48 of the servomotor and then to controllably admit atmospheric air pressure into chamber 48 through filter 60. This establishes a differential pressure acting across power wall 46 and generates a brake booster force transmitted from the power wall through output push rod 62 to actuate master cylinder 24. In order to release the brakes, the operator permits push rod 56 to be moved to the right, control valve assembly 58 therefore closing the atmospheric air connection to chamber 48 and then re-opening the vacuum connection of chamber 48 to vacuum chamber 30. Since this causes an absolute pressure increase in the booster, and particulary in vacuum chamber 30, air from the booster is evacuated through check valve assembly 26 and vacuum conduit 32 to the vacuum source 14. The servomotor is therefore fully re-charged with vacuum. In this process there is air flow from the servomotor 22 through conduit 32 to the vacuum source 14. This is normal brake booster operation as is commonly practiced in the art.

It has been found that upon some conditions of operation, fuel vapor present at intake 14, either while the engine is running or while it is stopped, can be entrained in a flow of air going from tap-in point 36 toward the booster servomotor 22. One such condition can occur if the check valve 74 does not fully seat on seat 72 while at the same time the absolute pressure at tap-in point 36 is greater than the absolute pressure in chamber 30. If fuel vapor is so present at tap-in point 36, it can also flow through conduit 32 into vacuum chamber 30. It may remain in the chamber 30 in a vapor state or under some circumstances may be condensed in the chamber. It has been found that sufficient concentration of condensed fuel vapor inside servomotor 22 can have an adverse effect on certain parts of the servomotor, and particularly the diaphragm 52. For this reason it is desirable to guard the servomotor against the presence of vapor inside housing 28. Therefore filter assembly 34 is placed in vacuum conduit 32. Thus when under the conditions wherein fuel vapor is entrained in an air flow from vacuum source 14 toward the booster servomotor 22, the vapor will be trapped or adsorbed by the activated charcoal 86 in filter chamber 80 and prevented from passing through the filter beyond port 82. The servomotor is therefore guarded against the presence of such deleterious vapor. If this occurred while the engine was stopped, and the engine is thereafter started, air flow will take place from chambers 48 and 30 through vacuum check valve assembly 26, hose 40, filter assembly 34, and pipe 38 to the vacuum source 14 to recharge the servomotor with vacuum. This air flow will pass through the activated charcoal 86, entraining the adsorbed or trapped fuel vapor, and returning it to the engine fuel and air intake. Thus the fuel vapor is desorbed and the activated charcoal of the filter is purged. This depurging action also occurs each time that the power brake booster is actuated and then released to cause such flow from the booster to the engine as above described.

What is claimed is:

1. In combination:
   a vacuum suspended power brake booster having
   a diaphragm dividing the booster into a vacuum chamber and
   a variable pressure chamber into which atmospheric air is selectively admitted to operate the booster, said diaphragm having the characteristic that it may be deleteriously affected by condensed fuel vapor in contact therewith, said chambers being interconnected during brake booster release,
   and means selectively interrupting the connection between said chamber when the booster is actuated;
   an internal combustion engine having a fuel and air intake acting as a vacuum source when the engine is running and having fuel vapor therein;
   a conduit fluidly connecting said intake and said vacuum chamber of said booster to provide vacuum thereto, said conduit including means normally retaining in said vacuum chamber the vacuum provided thereto by interrupting the fluid connection between said intake and said vacuum chamber when the absolute pressure in said intake is greater than the absolute pressure in said vacuum chamber but occasionally operating under certain conditions to reestablish such connection so that fuel vapor from said intake is drawn toward said brake booster by the lower absolute pressure in said vacuum chamber;
   the improvement comprising a vapor guard system to prevent fuel vapor from said intake from reaching said diaphragm, said vapor guard system including an activated charcoal filter in said conduit connected on one side to said brake booster through said retaining means and on the other side to said intake so that all fluid flow in said conduit betwee said intake and said brake booster must pass through the activated charcoal of said filter, said activated charcoal acting to adsorb any fuel vapor tending to flow in said conduit from said intake toward said brake booster and acting to desorb the previously adsorbed fuel vapor with air flow through said conduit from the interconnected chambers of said brake booster to said intake, said filter thereby guarding said brake booster and the diaphragm therein against the presence of fuel vapor from said intake and periodically purging itself of any fuel vapor adsorbed therein.

2. A vapor guard system comprising:
   a vacuum suspended power booster having one or more parts therein which may be adversely affected by concentrations of certain vapors including fuel vapors, and particularly condensed fuel vapors;
   an internal combustion engine having a fuel and air intake acting as a vacuum source for said booster when the engine is running, said intake normally having fuel vapor therein;
   a conduit fluidly connecting said intake and said booster to provide vacuum thereto, said conduit also being capable under certain conditions of conducting fuel vapor from said intake toward said booster;
   and a filter in said conduit connected only to said booster on one side and said intake on the other side so that all fluid flow in said conduit between said intake and said booster must pass through said filter, said filter having therein a material which acts to adsorb fuel vapor tending to flow in said conduit from said intake when fluid flow in said conduit occurs toward said booster and acting to purge itself by desorbing the previously adsorbed fuel vapor with air flow through said conduit from said booster to said intake so that the fuel vapor so desorbed is returned to said intake, said filter thereby guarding said booster and particularly said parts therein against the adverse presence of fuel vapor from said intake and periodically purging itself of fuel vapor adsorbed therein.

3. In a power servomotor system having a servomotor operated by differential air pressures with one pressure being atmospheric air and the other pressure being air at other than atmospheric air and generated by a pressure source which also entrains vapors therein which are capable of adversely affecting said servomotor if the vapors enter said servomotor and particularly if the vapors are condensed therein, said servomotor being connected to said pressure source by a fluid conduit, the improvement comprising a vapor trap in said conduit which traps and holds said entrained vapors in other pressure otherpressure air which would otherwise be transmitted to said servomotor from said pressure source during air flow from said pressure source to said servomotor through said fluid conduit, said vapor trap being purged of vapors so trapped therein upon air flow through said fluid conduit from said servomotor to said pressure source.

* * * * *

UNITED STATES PATENT AND TRADEMARK OFFICE
CERTIFICATE OF CORRECTION

PATENT NO. : 4,109,464
DATED : August 29, 1978
INVENTOR(S) : Warren A. Wickland

It is certified that error appears in the above-identified patent and that said Letters Patent are hereby corrected as shown below:

Column 5, line 38, "betwee" should read -- between --.

Column 6, line 43, delete "otherpressure".

Signed and Sealed this

Fifteenth Day of May 1979

[SEAL]

Attest:

RUTH C. MASON
Attesting Officer

DONALD W. BANNER
Commissioner of Patents and Trademarks